US006449134B1

United States Patent
Beach et al.

(10) Patent No.: US 6,449,134 B1
(45) Date of Patent: Sep. 10, 2002

(54) READ HEAD WITH FILE RESETTABLE DUAL SPIN VALVE SENSOR

(75) Inventors: Robert Stanley Beach, Los Gatos; Matthew Carey, San Jose; Bruce A. Gurney, San Rafael, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/369,076

(22) Filed: Aug. 5, 1999

(51) Int. Cl.[7] .............................. G11B 5/127; G11B 5/33
(52) U.S. Cl. .................................................. 360/324.12
(58) Field of Search ....................... 360/324.1, 324.12, 360/314, FOR 213, 313, 110

(56) References Cited

U.S. PATENT DOCUMENTS

| 5,159,513 | A | | 10/1992 | Dieny et al. | 360/324.1 |
|---|---|---|---|---|---|
| 5,287,238 | A | * | 2/1994 | Baumgart et al. | 360/314 |
| 5,408,377 | A | * | 4/1995 | Gurney et al. | 360/325 |
| 5,465,185 | A | | 11/1995 | Heim et al. | 360/324.11 |
| 5,650,887 | A | | 7/1997 | Dovek et al. | 360/75 |
| 5,748,399 | A | | 5/1998 | Gill | 360/66 |
| 5,768,069 | A | | 6/1998 | Mauri | 360/314 |
| 5,933,297 | A | * | 8/1999 | Hoshiya et al. | 360/324.1 |
| 6,074,767 | A | * | 6/2000 | Lin | 428/692 |
| 6,221,172 | B1 | * | 4/2001 | Saito et al. | 148/108 |

* cited by examiner

Primary Examiner—Robert S. Tupper
Assistant Examiner—Julie Anne Watko
(74) Attorney, Agent, or Firm—Altera Law Group, LLC

(57) ABSTRACT

A dual spin valve sensor is provided which is file resettable. An antiparallel (AP) coupled free layer structure is located between first and second pinned layer structures. The AP coupled free layer structure includes an AP coupling layer between first and second AP coupled free layers. When a current pulse is conducted through a sense current circuit the temperature of the sensor increases and conductive layers of the spin valve sensor exert current fields on the first and second pinned structures which set the magnetic spins of first and second antiferromagnetic pinning layers exchange coupled thereto. When the current pulse is terminated or reduced and the sensor cools the first and second pinning layers pin the magnetic moments of the first and second pinned layers antiparallel with respect to each other. Since magnetic moments of the first and second AP coupled free layers are also antiparallel with respect to each other the magnetic moments of the AP coupled free layer structure and the pinned layers are in phase so that a magnetoresistance, one on each side of the AP coupled free layer structure, are additive to provide a dual magnetoresistive effect.

65 Claims, 8 Drawing Sheets

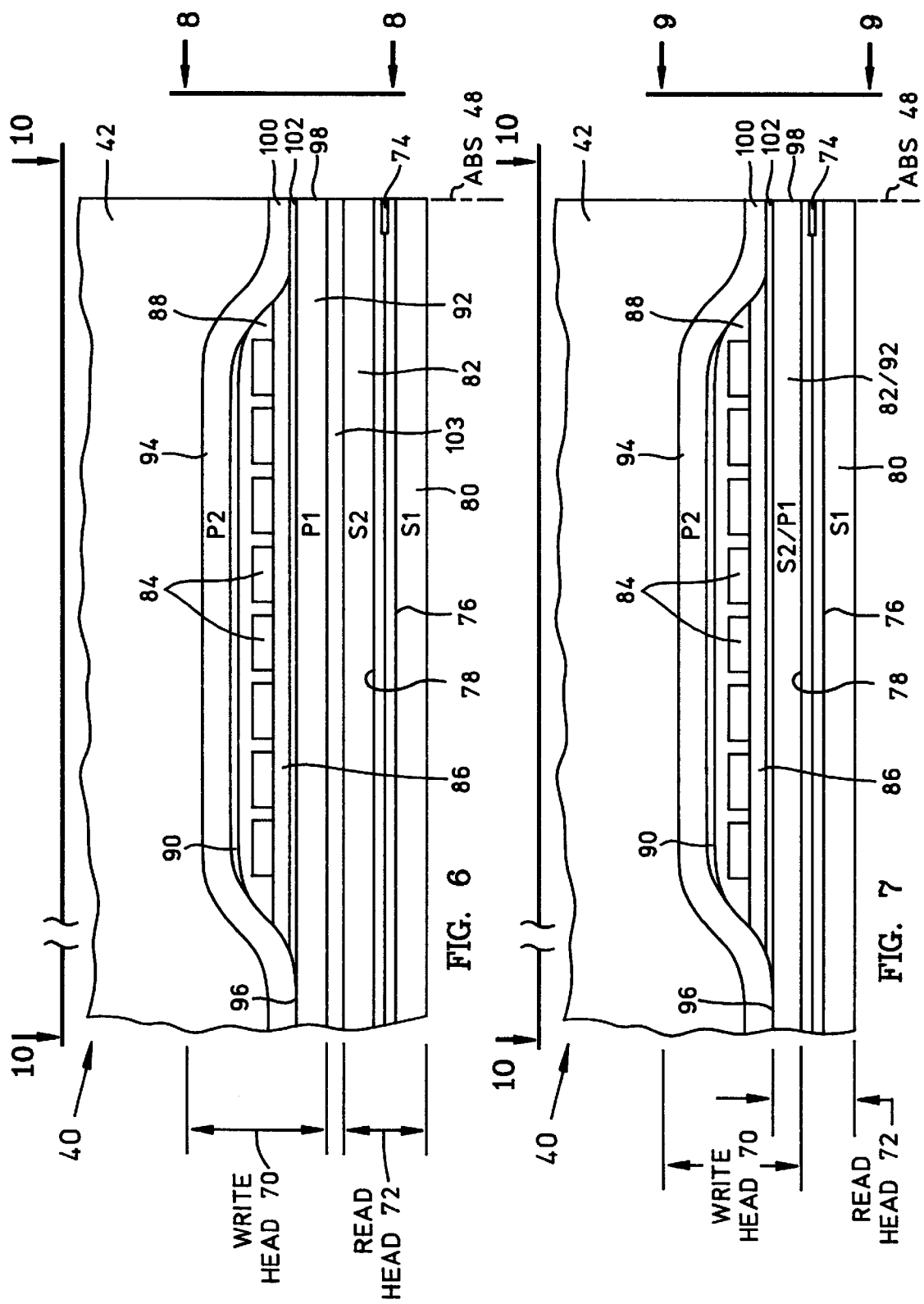

(ABS)

READ HEAD WITH FILE RESETTABLE DUAL SPIN VALVE SENSOR

BACKGROUND OF THE INVENTION

1. Field of the Invention

The present invention relates to a read head with a file resettable dual spin valve sensor and more particularly to a dual spin valve sensor in which magnetic spins of first and second pinning layers can be reset with a current pulse from a sense current circuit.

2. Description of the Related Art

A spin valve sensor is employed by a read head for sensing magnetic fields on a moving magnetic medium, such as a rotating magnetic disk. A typical sensor includes a nonmagnetic electrically conductive first spacer layer sandwiched between a ferromagnetic pinned layer and a ferromagnetic free layer. An antiferromagnetic pinning layer interfaces and is exchange coupled to the pinned layer for pinning a magnetic moment of the pinned layer 90° to an air bearing surface (ABS) where the ABS is an exposed surface of the sensor that faces the rotating disk. First and second leads are connected to the spin valve sensor for conducting a sense current therethrough. A magnetic moment of the free layer is typically oriented parallel to the ABS in a quiescent condition where the quiescent condition is when the sense current is conducted through the sensor in the absence of any signal fields. The magnetic moment of the free layer is free to rotate from the parallel position in response to signal fields from the rotating magnetic disk.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons are scattered at the interfaces of the spacer layer with respect to the pinned layer and the free layer. When the magnetic moments of the pinned and free layers are parallel with respect to one another scattering is minimal and when their magnetic moments are antiparallel scattering is maximized. Changes in scattering, in response to field signals from a rotating disk, changes the resistance of the spin valve sensor as a function of $\cos \theta$, where $\theta$ is the angle between the magnetic moments of the pinned and free layers. The sensitivity of the sensor is quantified as magnetoresistive coefficient $dr/R$ where $dr$ is the change in resistance of the sensor between parallel and antiparallel orientations of the pinned and free layers and $R$ is the resistance of the sensor when the moments are parallel.

The transfer curve (readback signal of the spin valve head versus applied signal from the magnetic disk) of a spin valve sensor is a substantially linear portion of the aforementioned function of $\cos \theta$. The greater this angle, the greater the resistance of the spin valve to the sense current and the greater the readback signal (voltage sensed by processing circuitry). With positive and negative signal fields from a rotating magnetic disk (assumed to be equal in magnitude), it is important that positive and negative changes of the resistance of the spin valve sensor be equal in order that the positive and negative magnitudes of the readback signals are equal. When this occurs a bias point on the transfer curve is considered to be zero and is located midway between the maximum positive and negative readback signals. When the direction of the magnetic moment of the free layer is parallel to the ABS in the quiescent state the bias point is located at zero and the positive and negative readback signals are equal when sensing positive and negative signal fields from the magnetic disk. The readback signals are then referred to in the art as having symmetry about the zero bias point. When the readback signals are not equal the readback signals are asymmetric which equates to reduced storage capacity of a magnetic disk drive.

The location of the bias point on the transfer curve is influenced by three major forces on the free layer, namely a demagnetization field ($H_D$) from the pinned layer, a ferromagnetic coupling field ($H_F$) between the pinned layer and the free layer, and sense current fields ($H_I$) from all conductive layers of the spin valve except the free layer. When the sense current is conducted through the spin valve sensor, the pinning layer (if conductive), the pinned layer and the first spacer layer, which are all on one side of the free layer, impose sense current fields on the free layer that rotate the magnetic moment of the free layer in a first direction. The ferromagnetic coupling field from the pinned layer further rotates the magnetic moment of the free layer in the first direction. The demagnetization field from the pinned layer on the free layer rotates the magnetic moment of the free layer in a second direction opposite to the first direction. Accordingly, the demagnetization field opposes the sense current and ferromagnetic coupling fields and can be used for counterbalancing.

A dual spin valve sensor employs a ferromagnetic free layer between first and second ferromagnetic pinned layers wherein a first spacer layer separates the first pinned layer from the free layer and a second spacer layer separates the second pinned layer from the free layer. The first and second pinned layers are pinned by first and second antiferromagnetic pinning layers. With this arrangement, the magnetoresistive coefficient is increased by a factor of approximately 1.4 due to the spin valve effect on each side of the free layer. The magnetic spins of the pinning layers are set by cooling from a high temperature in the presence of a magnetic field. In a standard dual spin valve, it is necessary that the magnetic spins of the first and second pinning layers be set parallel with respect to each other in order for the spin valve effect to be additive. This is the case of a simple free layer which has only one layer or layered structure. A problem with this design arises when the dual spin valve undergoes an in file reset. The current in the sensor applies a magnetic circumferential magnetic field to the sensor. This results in the magnetic field applied to the two pinned layers being in opposite directions, setting the moments antiparallel. The spin valve effect from the upper and lower portions of the spin valve are no longer additive but instead subtract. Thus, no signal is produced in this configuration for a spin valve with a simple free layer.

Over the years a significant amount of research has been conducted to improve the magnetoresistive coefficient $dr/R$ of spin valve sensors without adversely affecting other performance factors such as biasing of the free layer and thermal stability of the pinning layers. These efforts have increased the storage capacity of computers from kilobytes to megabytes to gigabytes.

SUMMARY OF THE INVENTION

We have provided a dual spin valve sensor wherein first and second antiferromagnetic pinning layers of the sensor can be reset in a magnetic disk drive by a current pulse through the sense current circuit, which resetting is referred to hereinafter as file resettable. This has been accomplished by providing an antiparallel (AP) coupled free layer structure which is located between the first and second pinned layers with a first nonmagnetic conductive spacer layer between the first pinned layer and the free layer structure and a second nonmagnetic conductive spacer layer between the second pinned layer and the free layer structure. First and second antiferromagnetic pinning layers are exchange coupled to the first and second pinned layers for the purpose of setting the magnetic moments of the pinned layers. The file reset pulse sets these moments antiparallel with respect to each other, which is the proper orientation so that the spin valve effects, one on each side of the AP free layer structure, are additive. The free layer structure includes a nonmagnetic conductive antiparallel (AP) coupling layer which is located between first and second antiparallel (AP) coupled free layers. It is necessary that one of the first and second AP coupled free layers be thicker than the other of the first and second AP coupled free layers so that when the free layer structure responds to a signal field from a rotating magnetic disk one of the AP coupled free layers is responsive to the signal field from the disk and controls the rotation of the free layer structure. Since the thinner AP coupled free layer is strongly antiparallel coupled to the thicker AP coupled free layer it will rotate in the same direction as the thicker AP coupled free layer even though its magnetic moment is antiparallel to the magnetic moment of the thicker AP coupled free layer. Accordingly, when a signal field rotates the AP coupled free layer structure it is important that the orientations of the magnetic moments of the first and second pinned layer structures be in phase with respect to the orientations of the magnetic moments of the free layer structure so that the spin valve effects, one on each side of the free layer structure, are additive to promote a high magnetoresistive coefficient dr/R. In order for this in-phase relationship to occur it is necessary that the magnetic moments of the first and second pinned layer structures be antiparallel with respect to one another and that they be pinned in these positions by the first and second pinning layers. Accordingly, the magnetic spins of the first and second pinning layers must be properly set to accomplish this purpose.

A current pulse conducted through the conductive layers of the spin valve sensor via the sense current circuit will cause magnetic fields on the first and second pinned layer structures from other conductive layers of the sensor. These fields set the magnetic spins of the first and second pinning layers. A current pulse sufficient to raise the temperature of the spin valve sensor to the blocking temperature of the materials employed for the first and second pinning layers will provide the necessary heat so that the current fields from the conductive layers of the sensor will implement a proper setting of the magnetic spins of the pinning layers. For example, iron manganese (FeMn) has a blocking temperature of 160° C. With a current pulse through the sense current circuit of a magnitude sufficient to raise the temperature of the spin valve sensor at or above 160° C. current fields from the conductive layers of the spin valve sensor on one side of the first pinned layer structure will orient the magnetic moment of the first pinned layer structure in a first direction perpendicular to the ABS while current fields from the conductive layers of the spin valve sensor on one side of the second pinned layer will cause the magnetic moment of the second pinned layer to be antiparallel to the magnetic moment of the first pinned layer. This will cause the magnetic spins of the first and second pinning layers to align with the magnetic moments of the first and second pinned layers which means that the magnetic spins of the first and second pinning layers are also antiparallel. When the current pulse is terminated and the spin valve sensor cools below the blocking temperature the magnetic spins of the first and second pinning layers are set in their orientations since they are no longer free to move at a temperature below their blocking temperatures.

In a preferred embodiment the same material is employed for each of the first and second pinning layers with a blocking temperature preferably below 280° C. It should be noted that the operating temperature of a spin valve sensor in a magnetic disk drive is between 80° C. to 120° C. with a sense current pulse of approximately 0.03 volts. We have found that a current pulse of approximately 0.9 volts for a period of 10 nanoseconds is sufficient for resetting pinning layers with a low blocking temperature. It should be noted that the key to providing a file resettable dual spin valve sensor is the AP coupled free layer structure wherein the magnetic moments of the first and second AP coupled free layers are antiparallel with respect to one another. Since the current fields on each side of the free layer structure are likewise antiparallel this then implements the required in-phase relationship between the first and second pinned layer structures and the AP coupled free layer structure.

Employment of the AP coupled free layer structure has another distinct advantage. In high recording densities of the future the prior art single free layer may be required to be as thin as 20 Å of nickel iron (NiFe) in order to match the low moment of the signal fields from a rotating magnetic disk. Unfortunately, this thickness is too thin to provide optimized magnetoresistance between the free and pinned layers. The thickness of the free layer that optimizes the magnetoresistive signal is largely governed by the longer of the spin-up and spin-down electron mean free paths within the ferromagnetic layers which is typically about 50 Å. Layers thinner than the optimal thickness do not permit electrons to travel as far as if the layer thickness were optimized thereby reducing the magnetoresistance. With the AP coupled free layer structure it is only necessary that the net magnetic moment of the free layer structure be matched to the moment of the signal field. Accordingly, in the dual spin valve sensor each of the AP coupled free layers has a thickness sufficient to optimize the magnetoresistance on each side of the free layer structure. For instance, the first AP coupled free layer may be 50 Å of nickel iron (NiFe) and the second AP coupled free layer may be 70 Å of nickel iron (NiFe). This provides the optimized magnetoresistance on each side of the free layer structure while providing a net moment of the free layer structure of only 20 Å of nickel iron (NiFe) which can match future requirements of low moment signals from the rotating magnetic disk. An AP coupled free layer structure is fully described in commonly assigned U.S. Pat. No. 5,768,069 which is incorporated by reference herein.

In a further preferred embodiment, each of the first and second pinned layer structures is an antiparallel (AP) pinned layer structure with a nonmagnetic conductive antiparallel (AP) coupling layer between first and second antiparallel (AP) ferromagnetic pinned layers. The AP coupled pinned layer structure is fully described in commonly assigned U.S. Pat. No. 5,465,185 which is incorporated by reference herein. The first and second pinning layers pin the first AP coupled pinned layers of the first and second AP pinned layer structures perpendicular to the ABS in an antiparallel relationship and the first AP pinned layers of the first and second AP pinned layer structures pin the second AP pinned layers of the first and second AP pinned layer structures perpendicular to the ABS antiparallel with respect to one another. Accordingly, the desired in-phase relationship between the first and second AP pinned layers and the free layer structure is obtained by the aforementioned process of setting the magnetic spins of the first and second pinning layers. An advantage of the AP pinned structures is that the net moment of these structures may be less than that of a single pinned layer, promoting a higher exchange field when these structures are coupled to the antiferromagnetic pinning layers. Further, since the magnetic moments of the first and second AP pinned layers of each of the first and second AP pinned layer structures are antiparallel there is flux closure between these AP pinned layers.

Since one of the AP pinned layers has to be thicker than the other in order to control a setting of the magnetic spins of the corresponding pinning layer, each AP pinned layer structure has a net demagnetization field. In a preferred embodiment the first and second AP pinned layer structures are symmetrical so that their net demagnetization fields are equal. Since these net demagnetization fields are in opposite directions they will completely counterbalance one another so as to exert no net demagnetization field on the free layer structure. Accordingly, demagnetization fields from the first and second AP pinned layer structures will have no influence on rotating the magnetic moments of the free layer structure from their parallel orientations to the ABS which is required for a zero bias point and read signal symmetry. It should be noted that if the first and second AP pinned layer structures are symmetrical sense current fields from layers of the first and second AP pinned structures on the free layer structure will likewise counterbalance each other. Optionally, the thicknesses of the layers of the first and second AP pinned layer structures may be fashioned with different thicknesses so as to provide a net demagnetization field and a net sense current field on the free layer structure which may be employed for counterbalancing ferromagnetic coupling fields exerted on the first and second AP coupled free layers by the second AP pinned layers of the first and second AP pinned layer structures. The first and second AP pinned layer structures provide considerable flexibility in maintaining a desired parallel position of magnetic moments of the free layer structure in a quiescent condition of the sensor, namely conduction of sense current in the absence of any signal fields.

An object of the present invention is to provide a read head with a file resettable dual spin valve sensor.

Another object is to provide a spin valve sensor with a free layer structure which optimizes magnetoresistance and moment matching of the media.

A further object is to provide a dual spin valve sensor which promotes symmetry of a read signal, which can be reset in a magnetic disk drive and which promotes high magnetoresistance and recording densities.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
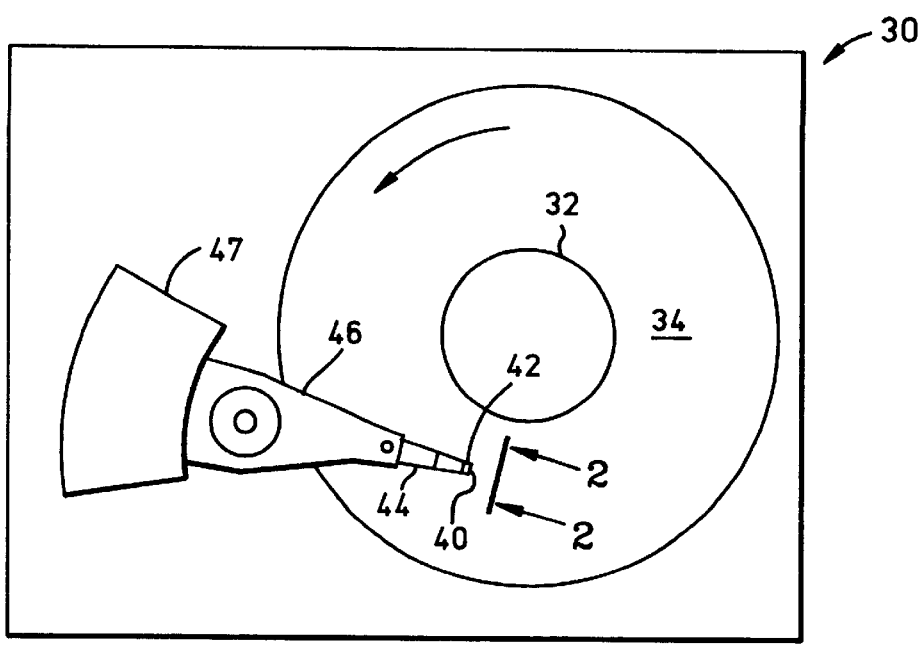
FIG. 1 is a planar view of an exemplary magnetic disk drive.
Figure 2:
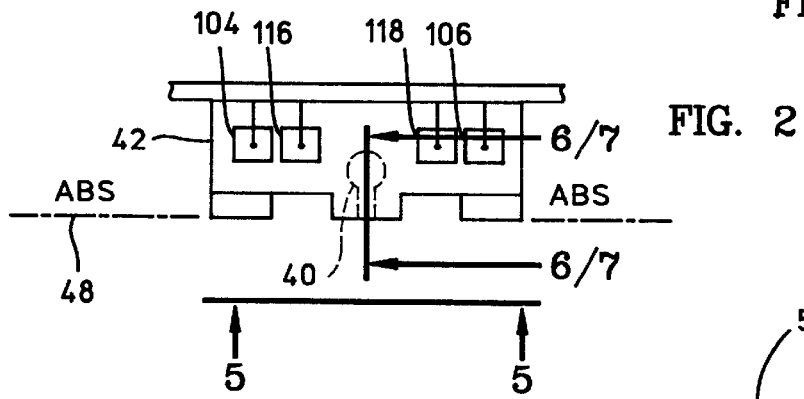
FIG. 2 is an end view of a slider with a magnetic head of the disk drive as seen in plane 2—2.
Figure 3:
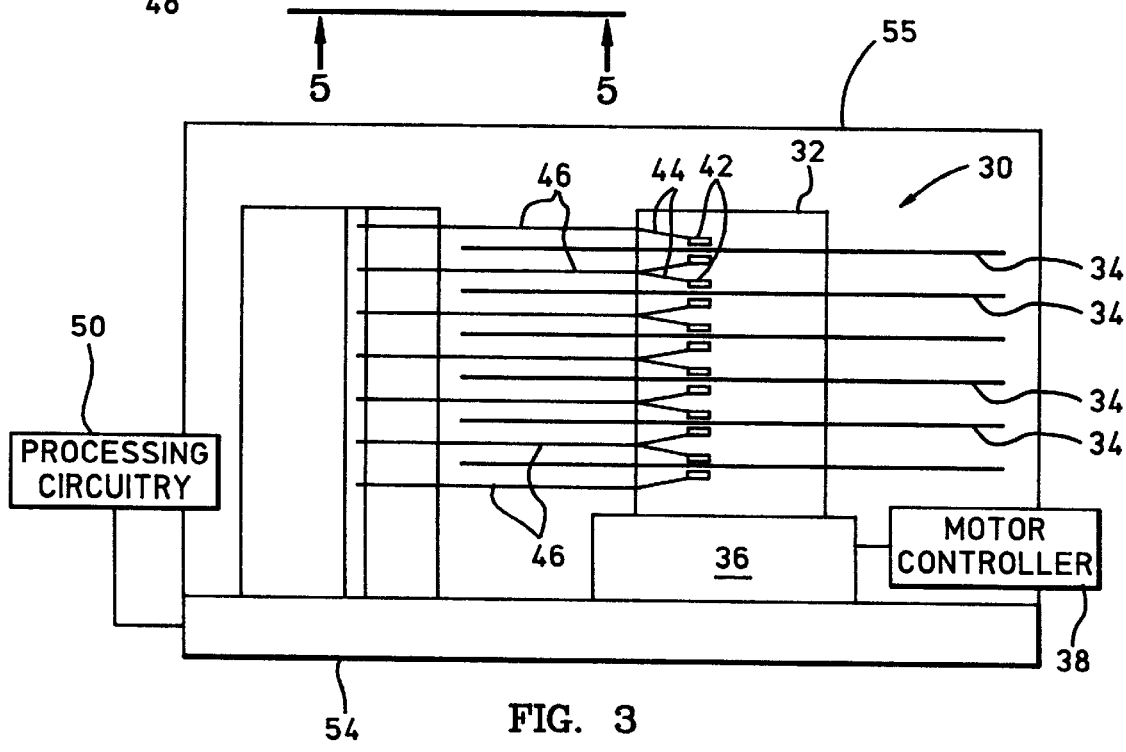
FIG. 3 is an elevation view of the magnetic disk drive wherein multiple disks and magnetic heads are employed.
Figure 4:
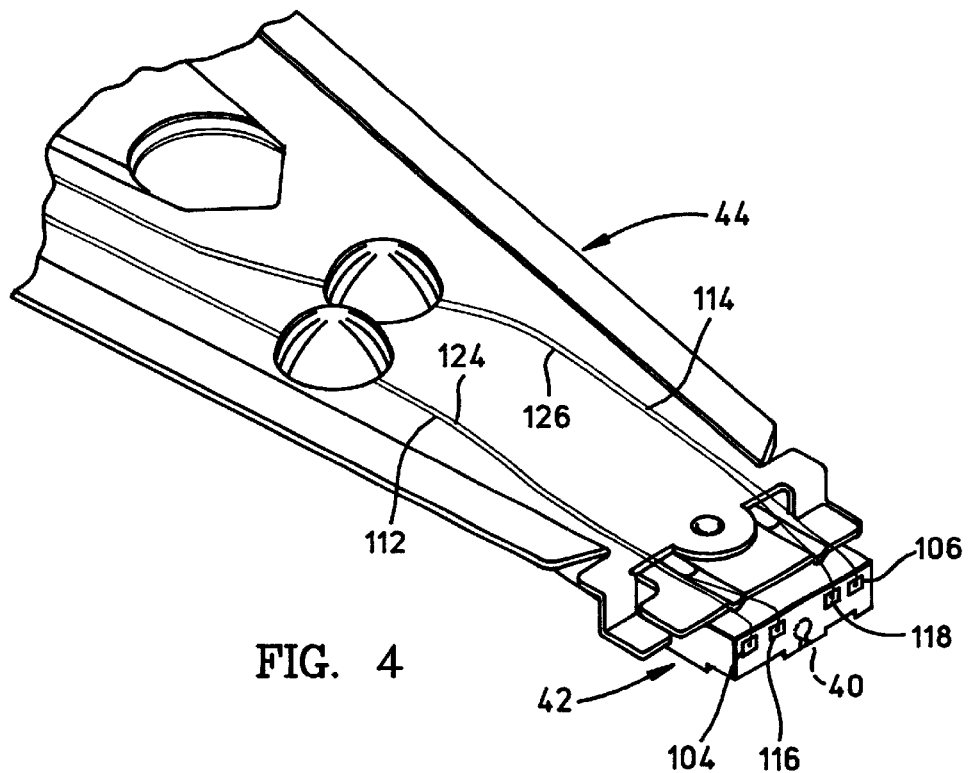
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 supports a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator 47 for moving the slider to various tracks. In FIG. 4 the slider 42 is shown mounted to a suspension 44. The components described hereinabove may be mounted on a frame 54 of a housing 55, as shown in FIG. 3.

Figure 5:
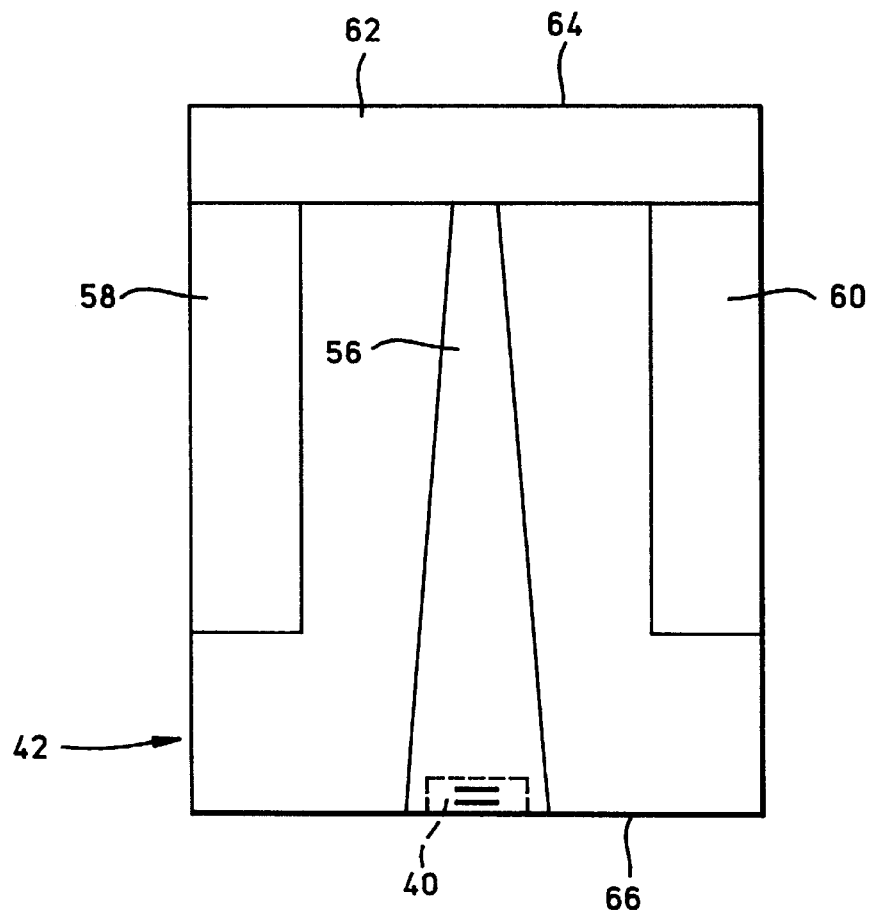
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
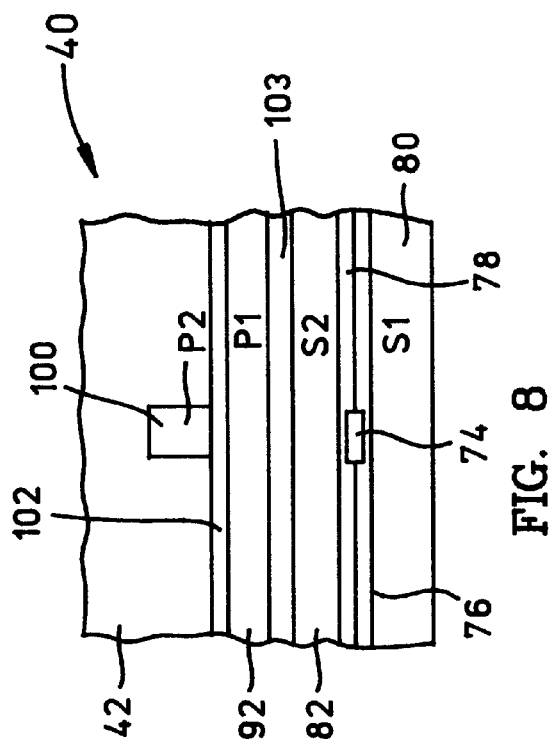
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
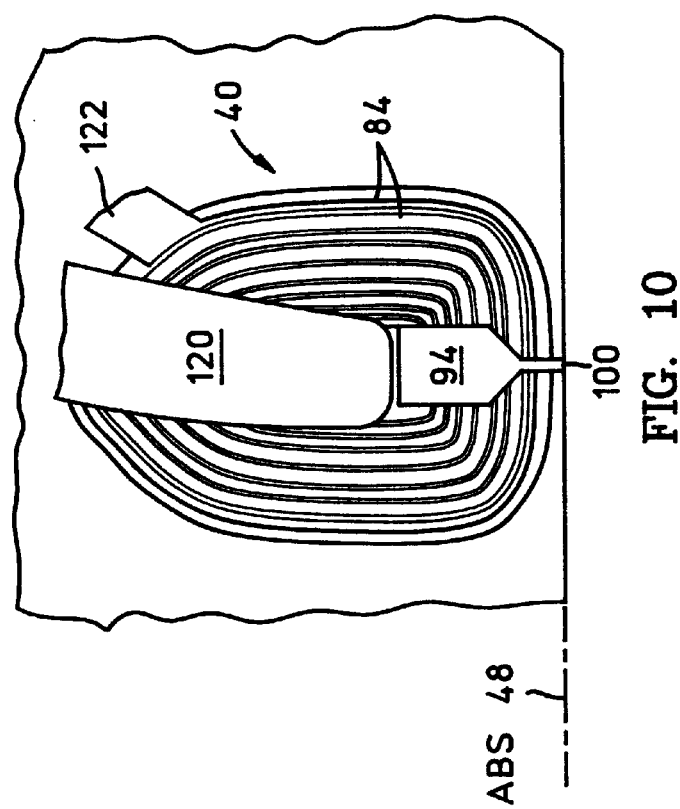
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
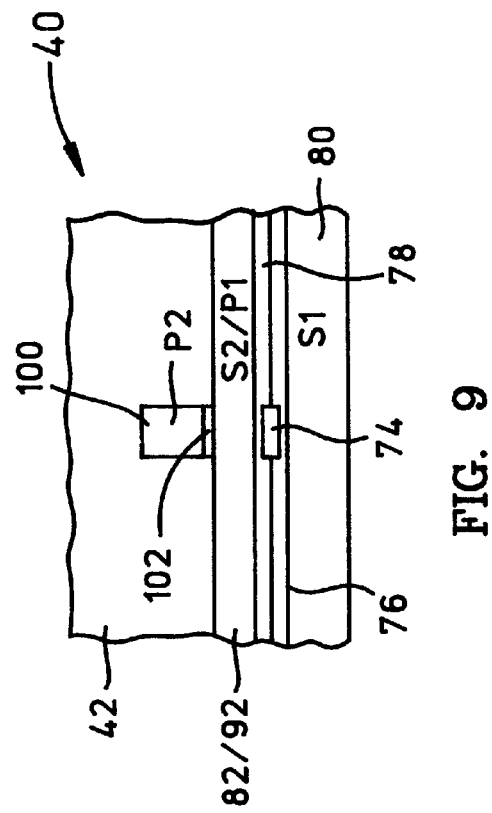
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
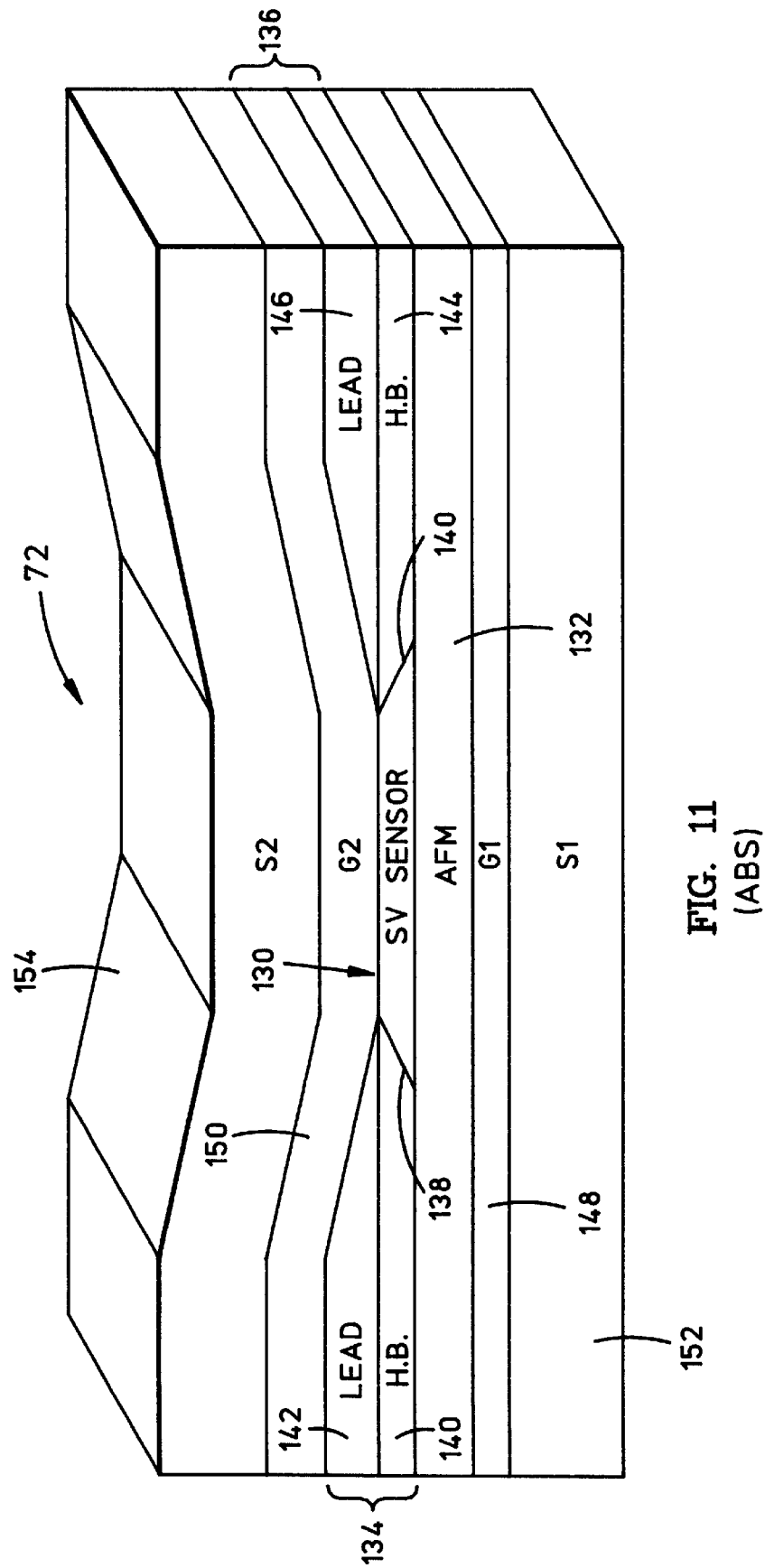
FIG. 11 is an isometric ABS illustration of a prior art read head which employs a spin valve sensor longitudinally biased by hard biasing layers.

FIG. 11 is an isometric ABS illustration of a prior art read head 72 which has a spin valve sensor 130. The spin valve sensor 130 has a pinned layer structure, to be described hereinafter, which has a magnetic moment that is pinned by an antiferromagnetic (AFM) pinning layer 132. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037. The first hard bias and lead layers include a first hard bias layer 140 and a first lead layer 142 and the second hard bias and lead layers 136 include a second hard bias layer 144 and a second lead layer 146. The hard bias layers 140 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

The Invention

Figure 12:
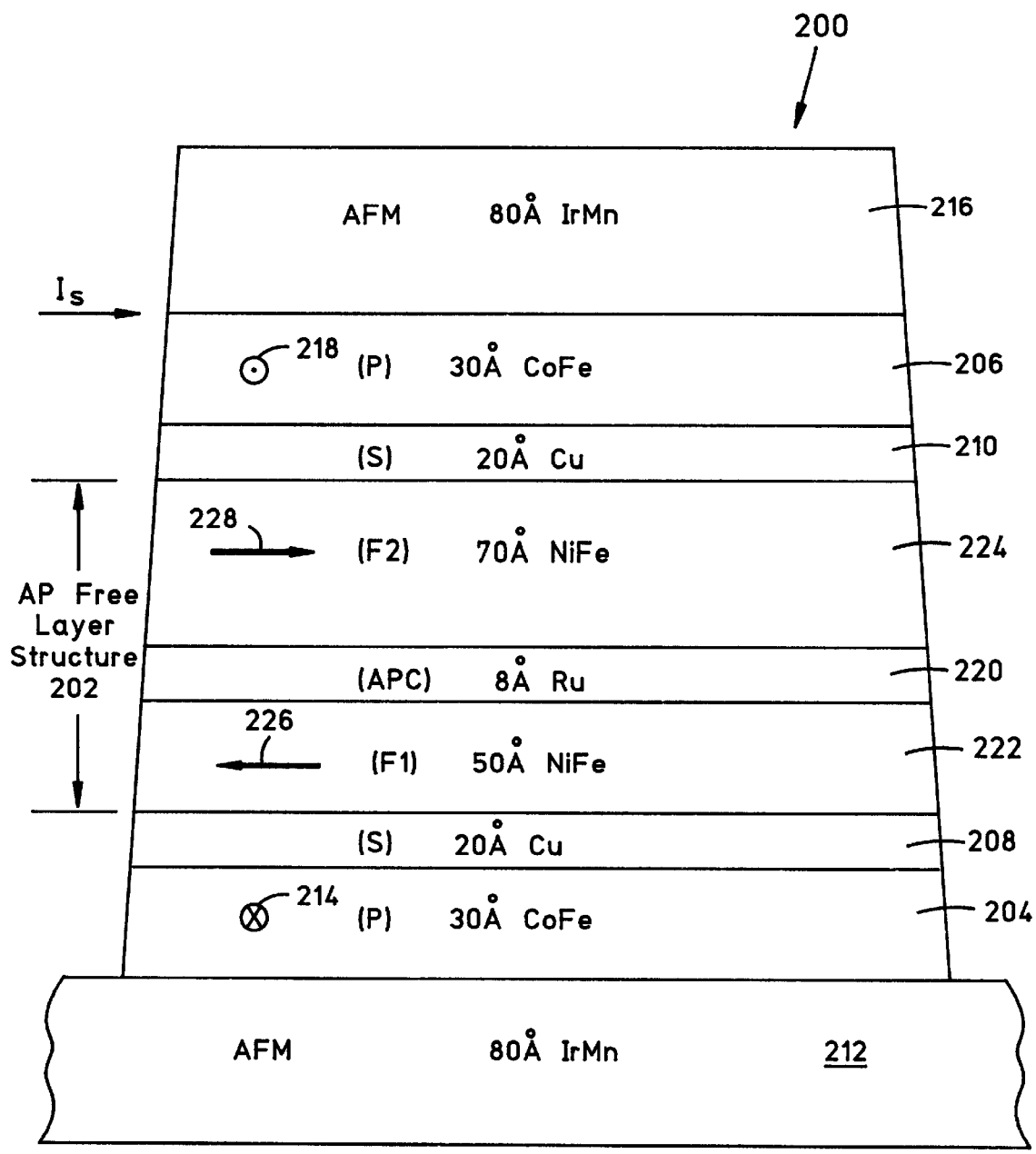
FIG. 12 is an air bearing surface (ABS) illustration of a first embodiment of the present spin valve sensor.

FIG. 12 illustrates a first embodiment of the present dual spin valve sensor 200 which includes an antiparallel (AP) coupled free layer structure 202 which is located between first and second pinned layer structures which, in this embodiment, are first and second single pinned layers 204 and 206. A nonmagnetic conductive first spacer layer(s) 208 is located between the first pinned layer 204 and the free layer structure 202 and a nonmagnetic conductive second spacer layer(s) 210 is located between the second pinned layer 206 and the free layer structure 202. A first antiferromagnetic (AFM) pinning layer 212 is exchange coupled to the pinned layer 204 for pinning a magnetic moment 214 of the pinned layer perpendicular to the ABS in a direction toward or away from the ABS as shown in FIG. 12. A second antiferromagnetic (AFM) pinning layer 216 is exchange coupled to the second pinned layer 206 for pinning a magnetic moment 218 of the second pinned layer perpendicular to the ABS in a direction away from or toward the ABS as shown in FIG. 12. The orientations of the magnetic moments 214 and 218 are antiparallel with respect to one another. Setting of the magnetic spins of the first and second pinning layers 212 and 216 will be discussed in more detail hereinafter.

The free layer structure 202 is an antiparallel (AP) coupled free layer structure which has an AP coupling layer (APC) 220 which is located between ferromagnetic first and second antiparallel (AP) free layers (F1) and (F2) 222 and 224. The first AP coupling layer 222 has a magnetic moment 226 which is parallel to the ABS in a direction from left to right or from right to left as shown in FIG. 12 and the second AP coupled free layer 224 has a magnetic moment 228 which is antiparallel to the magnetic moment 226 by a strong antiparallel coupling therebetween. One of the AP coupled free layers has a higher magnetic moment than the other, such as the second AP coupled free layer 224 which may be thicker, so that the magnetic moment 228 is controlling when responding to signal fields from a rotating magnetic disk. Accordingly, when a signal field rotates the magnetic field 228 downwardly toward the ABS the magnetic moment 226 will rotate upwardly away from the ABS because of the antiparallel coupling between the first and second AP coupled free layers 222 and 224.

It is preferred that the material or materials employed for the first and second pinning layers 212 and 216 have a low blocking temperature, such as below 280° C. In the preferred embodiment the first and second pinning layers 212 and 216 employ the same antiferromagnetic material. An exemplary material is iridium manganese (IrMn) which has a blocking temperature typically between 240° C.–300° C. An advantage of iridium manganese (IrMn) is that its thickness can be as low as 80 Å and still function as a pinning layer. This narrows the read gap between the first and second shield layers 80 and 82 in FIG. 6 which promotes increased storage capacity at the disk drive in FIG. 5. Another suitable material is iron manganese (FeMn) which has a blocking temperature of 160° C. and a required thickness of 150 Å and nickel oxide (NiO) which has a blocking temperature between 215° C. to 225° C. and a required thickness of 425 Å. It is desirable that the blocking temperature be maintained relatively low so that the microstructure of the various layers of the spin valve sensor are not altered during a process step of setting the magnetic spins of the first and second pinning layers 212 and 216 which process is described next.

Arrangement of the layers of the dual spin valve sensor 200 in FIG. 12 enables the magnetic spins of the first and second pinning layers 212 and 216 to be set by a current pulse through a sense current circuit which conducts the sense current $I_S$ during operation of the sensor in the magnetic disk drive. The sense current $I_S$ is conducted through the spin valve sensor 130 in FIG. 11 by the first and second hard bias and lead layers 134 and 136 in FIG. 11. The lead layers terminate at terminals 104 and 118 which are connected to leads 112 and 114, shown in FIG. 4, which are, in turn, connected to the processing circuitry 50, shown in FIG. 3. The processing circuitry 50 generates the sense current $I_s$ and detects potential changes due to resistance changes of the spin valve sensor in response to signal fields which are processed by the processing circuitry as playback signals. The present invention employs the processing circuitry 50 for generating the current pulse in the same direction as $I_S$ in FIG. 12 for causing the conductive layers of the spin valve sensor 200 to exert current fields on the first and second pinned layers 204 and 206 perpendicular to and in the direction of the magnetic moments shown at 214 and 218. The current pulse may be approximately 0.9 volts, which is approximately three times the voltage of the sense current $I_S$ applied for a duration of approximately 10 nanoseconds (ns) for raising the temperature of the first and second pinning layers 212 and 216 at or above their blocking temperatures so that the magnetic spins of the first and second pinning layers 212 and 216 align with the magnetic moments 214 and 218 and, upon relaxation of the current pulse and a drop in temperature, the magnetic spins of the first and second pinning layers 214 and 216 are set parallel to the magnetic moments 214 and 218.

In a preferred embodiment the material of the first and second pinning layers 212 and 216 is the same which may be a low blocking temperature antiferromagnetic such as iridium manganese (IrMn). Alternatively, the first and second pinning layers 212 and 216 may be made of different materials which have low blocking temperatures. Other suitable materials are iron manganese (FeMn) which has a blocking temperature of 160° C. and a required thickness of 150 Å and nickel oxide (NiO) which has a blocking temperature from 215° C. to 225° C. and a required thickness of 425 Å. Iridium manganese (IrMn) is a desirable antiferromagnetic material because its required thickness is only 80 Å. However, iridium manganese (IrMn) has a higher blocking temperature of 250° C. to 260° C. Other suitable materials for the pinning layers are NiMn, PdMn, PtMn, PdPtMn and $RFe_2O_3$ where R is a rare earth element or Yttrium. Whatever the blocking temperature, it is within the skill of one ordinarily skilled in the art to determine the current and the pulse duration required to meet or exceed the blocking temperature of the pinning layer with the highest blocking temperature for setting the spins of the first and second pinning layers 212 and 216.

In a preferred embodiment the antiferromagnetic material for each of the first and second pinning layers 212 and 216 is iridium manganese (IrMn) because of its thinness. Exemplary thicknesses and materials for the various layers of the spin valve sensor in FIG. 12 are 80 Å of iridium manganese (IrMn) for the pinning layers 212 and 216, 30 Å of cobalt iron (CoFe) or cobalt (Co) for the pinned layers 204 and 206, 20 Å of copper (Cu) for the spacer layers 208 and 210, 50 Å of nickel iron (NiFe) for the first AP coupled free layer 222, 8 Å of ruthenium (Ru) for the AP coupling layer 220 and 70 Å of nickel iron (NiFe) for the second AP coupled free layer 224.

It should be noted that the AP coupled free layer structure 202 has a net magnetic moment of 20 Å of nickel iron (NiFe) which is the difference between the thicknesses of the first and second AP coupled free layers 222 and 224. This is an exemplary net magnetic thickness for matching an equivalent magnetic moment from a signal field from a track on a rotating magnetic disk. By making the moment of the signal fields from the rotating magnetic disk small the read gap can be narrowed to increase linear read density. These advantages are obtained while maintaining the thickness of each of the AP coupled free layers 222 and 224 sufficient to optimize the magnetoresistive effect on each side of the free layer structure 202, which thickness has been accepted in the art as about 50 Å. The thicknesses of the first and second AP coupled free layers 222 and 224, as well as the thicknesses of the other layers of the spin valve sensor, are and may be varied as desired.

Figure 13:
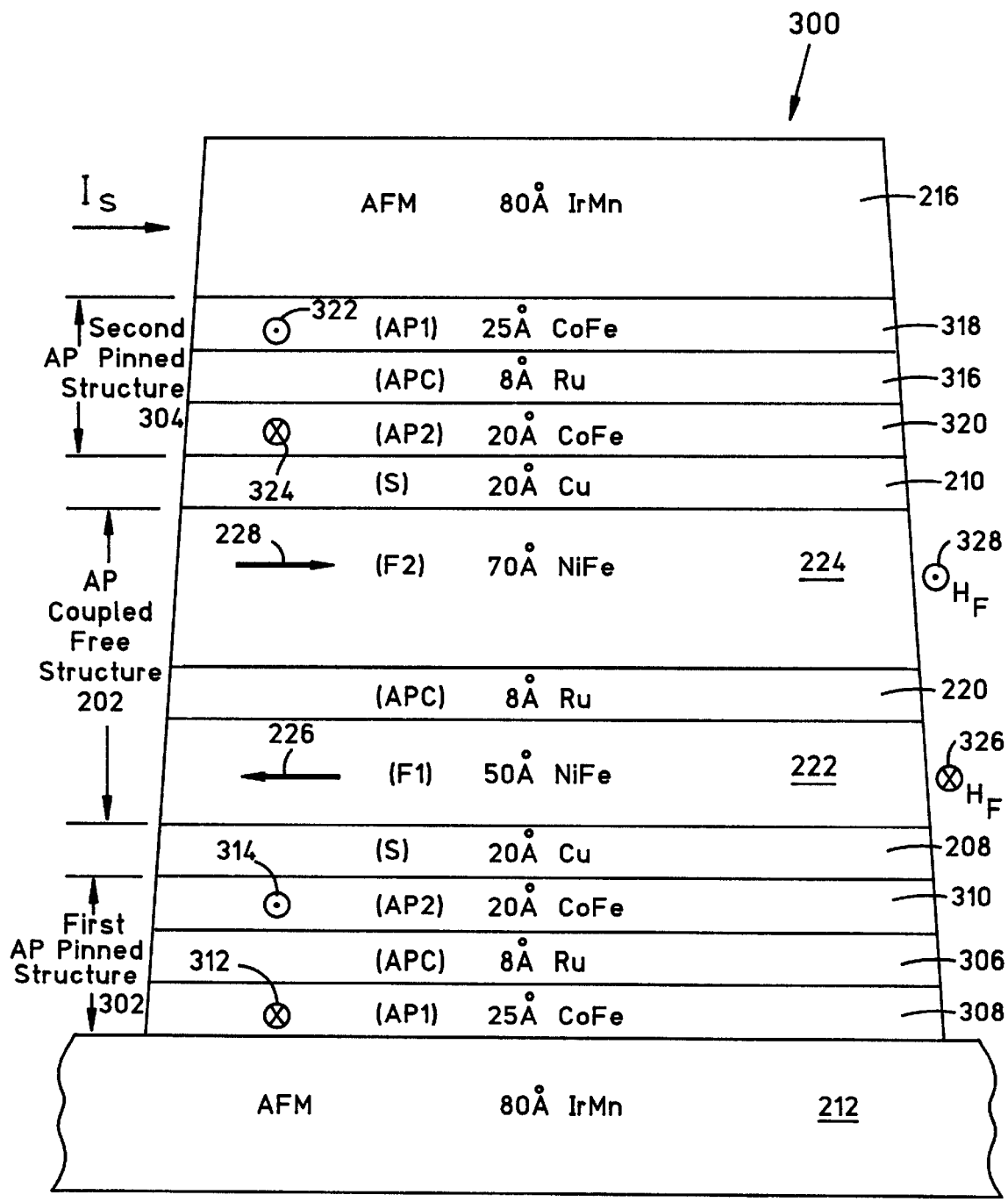
FIG. 13 is an ABS illustration of a second embodiment of the present spin valve sensor.

FIG. 13 illustrates a second embodiment of the present spin valve sensor 300 which is the same as the spin valve sensor 200 shown in FIG. 12 except first and second AP pinned structures 302 and 304 are substituted for the single pinned layers 204 and 206. The first AP pinned structure 302 includes an AP coupling layer (APC) 306 which is located between first and second AP pinned layers (AP1) and (AP2) 308 and 310. The pinning layer 212 pins a magnetic moment 312 of the first AP pinned layer perpendicular to the ABS in a direction toward or away from the ABS as shown in FIG. 13. By strong antiparallel coupling the magnetic moment 314 of the second AP pinned layer is oriented antiparallel to the magnetic moment 312. The second AP pinned structure 304 includes an AP coupling (APC) layer 316 which is located between first and second AP pinned layers (AP1) and (AP2) 318 and 320. The pinning layer 216 pins the magnetic moment 322 of the first AP pinned layer perpendicular to the ABS in a direction away from the ABS or toward the ABS as shown in FIG. 13. By strong antiparallel coupling between the first and second AP pinned layers the magnetic moment 324 is pinned antiparallel to the magnetic moment 322.

Exemplary thicknesses and materials for the first and second AP pinned layer structures 302 and 304 are 25 Å of cobalt iron (CoFe) or cobalt (Co) for the first AP pinned layers 308 and 318, 8 Å of ruthenium (Ru) for the AP coupling layers 306 and 316 and 20 Å of cobalt iron (CoFe) or cobalt (Co) for the second AP pinned layers 310 and 320. It should be noted with this arrangement that each of the AP pinned structures 302 and 304 has a net magnetic moment of 5 Å of cobalt iron (CoFe) with a net magnetic moment of the first AP pinned structure 302 directed away from the ABS and the net moment of the second AP pinned structure 304 directed toward the ABS. These are equal net magnetic moments which have flux closure and completely counterbalance each other so as to exert no net demagnetization field from the first and second AP pinned structures on the free layer structure 202. An advantage of the AP pinned structures 302 and 304 is that the net moment of these structures may be less than that of a single pinned layer, promoting a higher exchange field when these structures are coupled to pinning layers 212 and 216. The pinning layers 212 and 216 maybe the same material, such as iridium manganese (IrMn) or may be different antiferromagnetic materials with different blocking temperatures. The magnetic spins of the first and second pinning layers 212 and 216 are set in the same manner as that described for the pinning layers 212 and 216 in FIG. 12. Since the first AP pinned layers 308 and 318 are thicker than the second AP pinned layers 310 and 320 they will control the direction of the magnetic moments in response to the current pulse for setting the magnetic spins. A current pulse in the same direction as $I_S$ directs the magnetic moment 312 perpendicular to and away from the ABS and directs the magnetic moment 322 perpendicular to and toward the ABS. This sets the magnetic spins of the first and second pinning layers 212 and 216 in the same directions which remains in those directions and pins the magnetic moments 312 and 322 of the AP pinned layer structures in the directions shown in FIG. 13 when the current pulse is relaxed and the spin valve sensor cools below the lowest blocking temperature.

Figure 14:
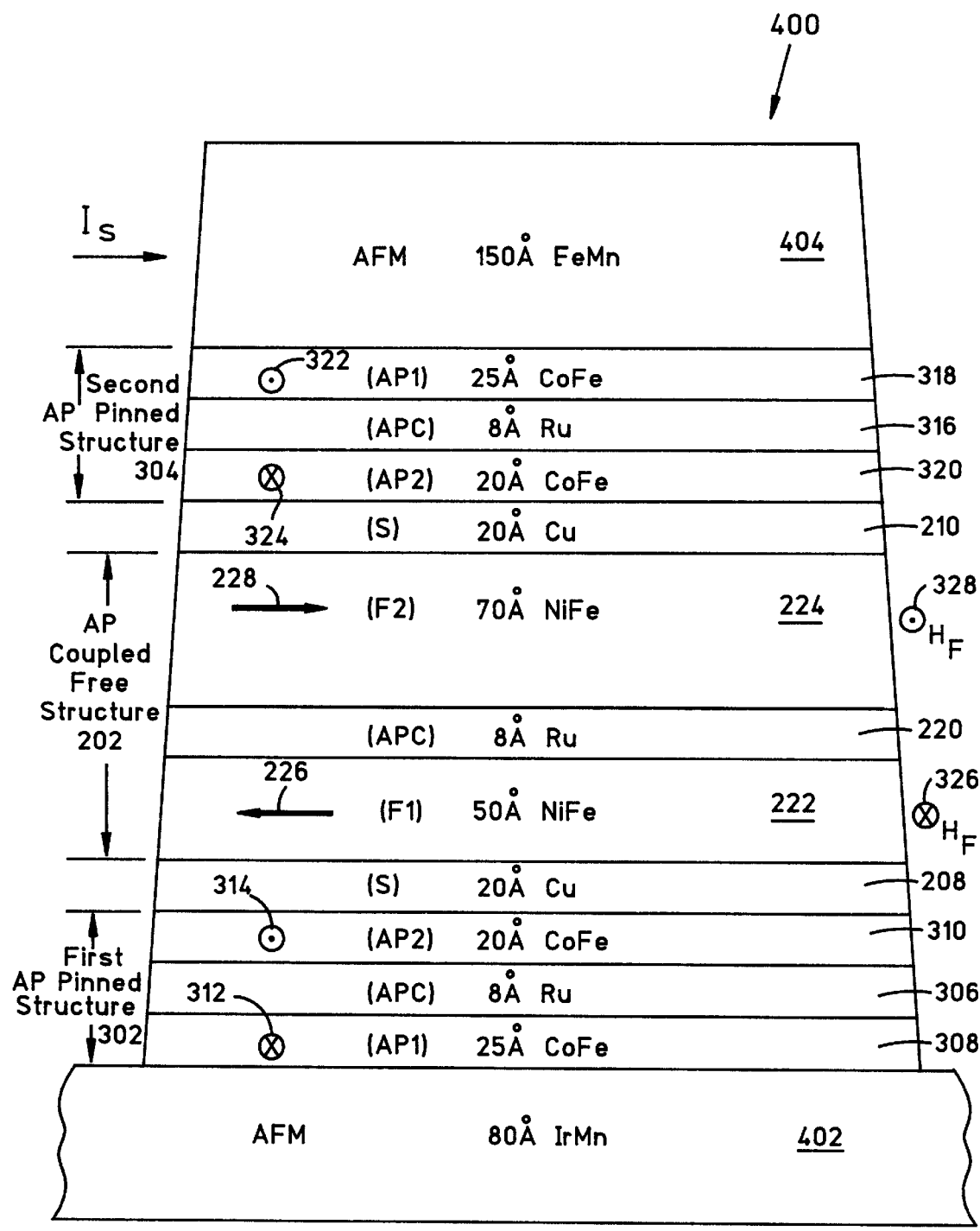
FIG. 14 is an ABS illustration of a third embodiment of the present spin valve sensor.

FIG. 14 illustrates a third embodiment of the present spin valve sensor 400 which is the same as the spin valve sensor 300 in FIG. 13 except for the first and second pinning layers 402 and 404 which are made of antiferromagnetic (AFM) materials of different blocking temperatures. In this embodiment the blocking temperature of the first pinning layer 402 is greater than the blocking temperature of the second pinning layer 404. This enables the magnetic spins of the first pinning layer 402 to be set by constructing the first AP pinned layer 308 on the first pinning layer 402 by sputter deposition in the presence of a field that is directed perpendicular to and away from the ABS at a temperature at or above the blocking temperature of the material of the first pinning layer 402. This orients the magnetic spins of the first pinning layer 402 in the same direction so that after sputter deposition and termination of the applied field and a lowering of the heat the magnetic spins of the first pinning layer 402 set the magnetic moment 312 in the direction shown. An exemplary material for the first pinning layer 402 is iridium manganese (IrMn) which has a blocking temperature of 250° C. to 260° C. An exemplary material for the second pinning layer 404 is iron manganese (FeMn) which has a blocking temperature of 160° C. After completing construction of the sensor 400 a current pulse in the same direction as $I_S$ is then employed for setting the magnetic spins of only the second pinning layer 404 which can be less than the current pulse required for setting the magnetic spins of the pinning layers 212 and 216 in FIG. 13 where both of the pinning layers are iridium manganese (IrMn). This then reduces the heat applied to the other layers so as to preserve their integrity. Other high blocking temperature antiferromagnetic materials that could be substituted for iridium manganese (IrMn) are nickel manganese (NiMn), platinum manganese (PtMn), platinum palladium manganese (PtPdMn) and palladium manganese (PdMn) which have blocking temperatures in the range of 300° C.–350° C.

Discussion

It should be noted that the first AP pinned structure 302 exerts a ferromagnetic coupling field $H_F$ on the free layer structure 202, as shown at 326, which is directed perpendicular and away from the ABS while the second AP structure 304 exerts a ferromagnetic coupling field $H_F$, shown at 328, which is perpendicular to and toward the ABS. These ferromagnetic coupling fields are additive and, since they are directed oppositely they cancel each other. These coupling fields can be modified by adjusting the thicknesses of the AP pinned layers of the first and second AP pinned structures 302 and 304 or by adjusting the thicknesses of the spacer layers 208 and 210. This will then permit the magnetic moments 226 and 228 to remain parallel to the ABS which is the zero biased position for promoting read signal symmetry. This same analysis also applies to the spin valve sensor 200 shown in FIG. 12. It should be noted that the first and second AP pinned layer structures 302 and 304 in FIGS. 13 and 14 are symmetrical so that the sense current fields therefrom counterbalance each other so as to have no effect on the AP coupled free layer structure 202.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic read head including a file resettable dual spin valve sensor comprising:

the dual spin valve sensor including:

first and second pinned layer structures wherein each pinned layer structure has a magnetic moment;

antiferromagnetic first and second pinning layers exchange coupled to the first and second pinned layer structures respectively for pinning the magnetic moments of the first and second pinned layers respectively;

an antiparallel (AP) coupled free layer structure located between the first and second pinned layer structures and having a magnetic moment;

a nonmagnetic conductive first spacer layer located between the first pinned layer structure and the AP coupled free layer structure and a nonmagnetic conductive second spacer layer located between the second pinned layer structure and the AP coupled free layer structure; the AP coupled free layer structure including:

an antiparallel (AP) coupling layer and ferromagnetic first and second antiparallel (AP) coupled free layers;

wherein the AP coupling layer being located between the first and second AP coupled free layers, one of the first and second AP coupled free layers selected to have a thickness greater than the other of the first and second AP coupled free layer to allow file resetting, wherein one of the first and second AP coupled free layers has a higher magnetic moment than the other of the first and second AP coupled free layers and wherein the first and second anti ferromagnetic pinning layers set the magnetic moments of the first and second pinned layers when a file reset current pulse is applied, the magnetic moments of the pinned layers being set antiparallel with respect to each other so that a spin valve effect on each side of the antiparallel coupled free layer structure are additive.

2. A magnetic read head as claimed in claim 1 comprising:

ferromagnetic first and second shield layers;

nonmagnetic nonconductive first and second read gap layers located between the first and second shield layers; and the dual spin valve sensor being located between the first and second read gap layers.

3. A magnetic read head as claimed in claim 2 wherein the blocking temperature of each of the materials of the first and second pinning layers is less than 350° C.

4. A magnetic read head as claimed in claim 3 wherein each of the materials of the first and second pinning layers are the same.

5. A magnetic read head as claimed in claim 4 wherein each of said materials of the first and second pinning layers is selected from the group comprising FeMn, NiO, IrMn, NiMn, PdMn, PtMn, PdPtMn and $RFe_2O_3$ where R is a rare earth element or Yttrium.

6. A magnetic read head as claimed in claim 2 including:

the first and second pinning layers being made of first and second materials with first and second blocking temperatures respectively; and the blocking temperatures being different.

7. A magnetic read head as claimed in claim 6 wherein:

said first material is iridium manganese (IrMn) or nickel oxide (NiO) and said second material is iron manganese (FeMn).

8. A magnetic read head as claimed in claim 2 wherein each pinned layer structure is an antiparallel (AP) pinned layer structure that includes:

an antiparallel (AP) coupling layer and first and second antiparallel (AP) pinned layers; and the AP coupling layer being located between the first and second AP pinned layers.

9. A magnetic read head as claimed in claim 8 wherein each of the first and second pinning layers is made of a material that has a blocking temperature less than 350° C.

10. A magnetic read head as claimed in claim 9 wherein the materials of the first and second pinning layers are the same.

11. A magnetic read head as claimed in claim 10 wherein the materials of the first and second pinning layers are selected from the group comprising FeMn, NiO, IrMn, NiMn, PdMn, PtMn, PdPtMn and $RFe_2O_3$ where R is a rare earth element or Yttrium.

12. A magnetic read head as claimed in claim 8 including:
the first and second pinning layers being made of first and second materials respectively with first and second blocking temperatures respectively; and the blocking temperatures being different.

13. A magnetic read head as claimed in claim 12 wherein: said first material is iridium manganese (IrMn) or nickel oxide (NiO) and said second material is iron manganese (FeMn).

14. A magnetic head assembly having a read head and a write head comprising:
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a file resettable dual spin valve sensor;
nonmagnetic nonconductive first and second read gap layers;
the dual spin valve sensor being located between the first and second read gap layers;
a ferromagnetic first shield layer; and
the first and second read gap layers being located between the first shield layer and the first pole piece layer; and
the dual spin valve sensor including:
first and second pinned layer structures wherein each pinned layer structure has a magnetic moment;
antiferromagnetic first and second pinning layers exchange coupled to the first and second pinned layer structures for pinning the magnetic moment of the first and second pinned layers respectively;
an antiparallel (AP) coupled free layer structure located between the first and second pinned layer structures and having a magnetic moment;
a nonmagnetic conductive first spacer layer located between the first pinned layer structure and the AP coupled free layer structure and a nonmagnetic conductive second spacer layer located between the second pinned layer structure and the AP coupled free layer structure;
the AP coupled free layer structure including:
an antiparallel (AP) coupling layer and ferromagnetic first and second antiparallel (AP) coupled free layers;
wherein the AP coupling layer being located between the first and second AP coupled free layers, one of the AP coupled free layers selected to have a thickness greater than the other of the first and second AP coupled free layer to allow file resetting, wherein one of the first and second AP coupled free layers has a higher magnetic moment than the other of the first and second AP coupled free layers and wherein the first and second anti ferromagnetic pinning layers set the magnetic moments of the first and second pinned layers when a file reset current pulse is applied, the magnetic moments of the pinned layers being set antiparallel with respect to each other so that a spin valve effect on each side of the antiparallel coupled free layer structure are additive.

15. A magnetic head assembly as claimed in claim 14 including:
the read head further including:
a ferromagnetic second shield layer;
a nonmagnetic separation layer; and
the separation layer being located between the second shield layer the first pole piece layer.

16. A magnetic head assembly as claimed in claim 14 wherein the blocking temperature of each of the materials of the first and second pinning layers is less than 350° C.

17. A magnetic head assembly as claimed in claim 16 wherein each of the materials of the first and second pinning layers are the same.

18. A magnetic head assembly as claimed in claim 17 wherein each of said materials of the first and second pinning layers is selected from the group comprising FeMn, NiO, IrMn, NiMn, PdMn, PtMn, PdPtMn and $RFe_2O_3$ where R is a rare earth element or Yttrium.

19. A magnetic head assembly as claimed in claim 14 including:
the first and second pinning layers being made of first and second materials with first and second blocking temperatures respectively; and
the blocking temperatures being different.

20. A magnetic head assembly as claimed in claim 19 wherein:
said first material is iridium manganese (IrMn) or nickel oxide (NiO) and said second material is iron manganese (FeMn).

21. A magnetic head assembly as claimed in claim 14 wherein each pinned layer structure is an antiparallel (AP) pinned layer structure that includes:
an antiparallel (AP) coupling layer and first and second antiparallel (AP) pinned layers; and
the AP coupling layer being located between the first and second AP pinned layers.

22. A magnetic head assembly as claimed in claim 21 wherein each of the first and second pinning layers is made of a material that has a blocking temperature less than 350° C.

23. A magnetic head assembly as claimed in claim 22 wherein the materials of the first and second pinning layers are the same.

24. A magnetic head assembly as claimed in claim 23 wherein the materials of the first and second pinning layers are selected from the group comprising FeMn, NiO, IrMn, NiMn, PdMn, PtMn, PdPtMn and $RFe_2O_3$ where R is a rare earth element or Yttrium.

25. A magnetic head assembly as claimed in claim 21 including:
the first and second pinning layers being made of first and second materials respectively with first and second blocking temperatures respectively; and
the blocking temperatures being different.

26. A magnetic head assembly as claimed in claim 25 wherein:
said first material is iridium manganese (IrMn) or nickel oxide (NiO) and said second material is iron manganese (FeMn).

27. A magnetic disk drive having at least one slider that has an air bearing surface (ABS), the slider supporting at least one magnetic head assembly that includes a read head and a write head, the disk drive comprising:
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a file resettable dual spin valve sensor;
nonmagnetic nonconductive first and second read gap layers;
the dual spin valve sensor being located between the first and second read gap layers;
a ferromagnetic first shield layer; and
the first and second read gap layers being located between the first shield layer and the first pole piece layer; and
the dual spin valve sensor including:
first and second pinned layer structures wherein each pinned layer structure has a magnetic moment and the magnetic moments of the first and second pinned layer structure being antiparallel with respect to each other;
antiferromagnetic first and second pinning layers exchange coupled to the first and second pinned layer structures for pinning the magnetic moment of the first and second pinned layers respectively;
an antiparallel (AP) coupled flee layer structure located between the first and second pinned layer structures and having a magnetic moment;
a nonmagnetic conductive first spacer layer located between the first
pinned layer structure and the AP coupled free layer structure and a
nonmagnetic conductive second spacer layer located between the
second pinned layer structure and the AP coupled free layer structure;
the AP coupled free layer structure including:
an antiparallel (AP) coupling layer and ferromagnetic first and second antiparallel (AP) coupled free layers;
wherein the AP coupling layer being located between the first and second AP coupled free layers, one of the first and second AP coupled free layers selected to have a thickness greater than the other of the first and second AP coupled free layer to allow file resetting, wherein one of the first and second AP coupled free layers has a higher magnetic moment than the other of the first and second AP coupled free layers and wherein the first and second anti ferromagnetic pinning layers set the magnetic moments of the first and second pinned layers when a file reset current pulse is applied, the magnetic moments of the pinned layers being set antiparallel with respect to each other so that a spin valve effect on each side of the antiparallel coupled free layer structure are additive; and
a housing;
a magnetic disk rotatably supported in the housing;
a support mounted in the housing for supporting the magnetic head assembly with its ABS facing the magnetic disk so that the magnetic head assembly is in a transducing relationship with the magnetic disk;
a spindle motor for rotating the magnetic disk;
an actuator connected to the support for moving the magnetic head assembly to multiple positions with respect to said magnetic disk; and
a processor connected to the magnetic head assembly, to the spindle motor and to the actuator for exchanging signals with the magnetic head assembly, for controlling rotation of the magnetic disk and for controlling the position of the magnetic head assembly relative to the magnetic disk.

28. A magnetic disk drive as claimed in claim 27 including:
the read head further including:
a ferromagnetic second shield layer;
a nonmagnetic separation layer; and
the separation layer being located between the second shield layer the first pole piece layer.

29. A magnetic disk drive as claimed in claim 27 wherein the blocking temperature of each of the materials of the first and second pinning layers is less than 350° C.

30. A magnetic disk drive as claimed in claim 29 wherein each of the materials of the first and second pinning layers are the same.

31. A magnetic disk drive as claimed in claim 30 wherein each of said materials of the first and second pinning layers is selected from the group comprising FeMn, NiO, IrMn, NiMn, PdMn, PtMn, PdPtMn and $RFe_2O_3$ where R is a rare earth element or Yttrium.

32. A magnetic disk drive as claimed in claim 27 including:
the first and second pinning layers being made of first and second materials with first and second blocking temperatures respectively; and
the blocking temperatures being different.

33. A magnetic disk drive as claimed in claim 32 wherein:
said first material is iridium manganese (IrMn) or nickel oxide (NiO) and said second material is iron manganese (FeMn).

34. A magnetic disk drive as claimed in claim 27 wherein each pinned layer structure is an antiparallel (AP) pinned layer structure that includes:
an antiparallel (AP) coupling layer and first and second antiparallel (AP) pinned layers; and
the AP coupling layer being located between the first and second AP pinned layers.

35. A magnetic disk drive as claimed in claim 34 wherein each of the first and second pinning layers is made of a material that has a blocking temperature less than 350° C.

36. A magnetic disk drive as claimed in claim 35 wherein the materials of the first and second pinning layers are the same.

37. A magnetic disk drive as claimed in claim 36 wherein the materials of the first and second pinning layers are selected from the group comprising FeMn, NiO, IrMn, NiMn, PdMn, PtMn, PdPtMn and $RFe_2O_3$ where R is a rare earth element or Yttrium.

38. A magnetic disk drive as claimed in claim 34 including:
the first and second pinning layers being made of first and second materials respectively with first and second blocking temperatures respectively; and
the blocking temperatures being different.

39. A magnetic disk drive as claimed in claim 38 wherein:
said first material is iridium manganese (IrMn) or nickel oxide (NiO) and said second material is iron manganese (FeMn).

40. A method of making a read head that includes a file resettable dual spin valve sensor comprising the steps of:
a making of the dual spin valve sensor comprising the steps of:
forming first and second pinned layer structures wherein each pinned layer structure has a magnetic moment;
forming antiferromagnetic first and second pinning layers exchange coupled to the first and second pinned layer structures for pinning the magnetic moment of the first and second pinned layers respectively; forming an antiparallel (AP) coupled free layer structure between the first and second pinned layer structures with a magnetic moment;
forming a nonmagnetic conductive first spacer layer between the first pinned layer structure and the AP coupled free layer structure and a nonmagnetic conductive second spacer layer between the second pinned layer structure and the AP coupled free layer structure;
a making of the AP coupled free layer structure including the steps of:
forming an antiparallel (AP) coupling layer and ferromagnetic first and second antiparallel (AP) coupled free layers with the AP coupling layer between the first and second AP coupled free layers with one of the AP coupled free layers selected to have a thickness greater than the other of the first and second AP coupled free layer to allow file resetting, wherein one of the first and second AP coupled free layers has a higher magnetic moment than the other AP coupled free layer; and
the magnetic moments of the first and second pinned layers being set by applying a file reset current pulse with the first and second anti ferromagnetic pinning layers orienting the magnetic moments of the first and second pinned layers, the magnetic moments of the pinned layers being set antiparallel with respect to each other so that a spin valve effect on each side of the antiparallel coupled free layer structure are additive.

41. A method as claimed in claim 40 comprising:
ferromagnetic first and second shield layers;
nonmagnetic nonconductive first and second read gap layers located between the first and second shield layers; and
the dual spin valve sensor being located between the first and second read gap layers.

42. A method as claimed in claim 40 wherein the blocking temperature of each of the materials of the first and second pinning layers is less than 350° C.

43. A method as claimed in claim 42 wherein each of the materials of the first and second pinning layers are the same.

44. A method as claimed in claim 43 wherein each of said materials of the first and second pinning layers is selected from the group comprising FeMn, NiO, IrMn, NiMn, PdMn, PtMn, PdPtMn and $RFe_2O_3$ where R is a rare earth element or Yttrium.

45. A method as claimed in claim 40 wherein the first and second pinning layers are formed of first and second materials with first and second blocking temperatures respectively that are different.

46. A method as claimed in claim 45 wherein said first material is iridium manganese (IrMn) or nickel oxide (NiO) and the second material is iron manganese (FeMn).

47. A method as claimed in claim 40 wherein a making of each of the first and second pinned layer structures includes the steps of forming an antiparallel (AP) coupling layer and first and second antiparallel (AP) pinned layers with the AP coupling layer located between the first and second AP pinned layers.

48. A method as claimed in claim 47 wherein each of the first and second pinning layers is made of a material that has a blocking temperature less than 350° C.

49. A method as claimed in claim 48 wherein the materials of the first and second pinning layers are the same.

50. A method as claimed in claim 49 wherein the materials of the first and second pinning layers are selected from the group comprising FeMn, NiO, IrMn, NiMn, PdMn, PtMn, PdPtMn and $RFe_2O_3$ where R is a rare earth element or Yttrium.

51. A method as claimed in claim 47 wherein the first and second pinning layers are formed of first and second materials respectively with first and second blocking temperatures respectively that are different.

52. A method as claimed in claim 51 wherein said first material is iridium manganese (IrMn) or nickel oxide (NiO) and the second material is iron manganese (FeMn).

53. A method of making a magnetic head assembly having a read head and a write head comprising the steps off a forming of the write head comprising the steps of:
forming ferromagnetic first and second pole piece layers with a yoke portion between a pole tip portion and a back gap portion;
forming a nonmagnetic write gap layer between the pole tip portions of the first and second pole piece layers;
forming an insulation stack with at least one coil layer embedded therein in the yoke portions of the first and second pole piece layers; and
connecting the first and second pole piece layers at their back gaps portions;
and a forming of the read head comprising the steps of:
forming nonmagnetic nonconductive first and second read gap layers;
forming a file resettable dual spin valve sensor between the first and second read gap layers;
forming a ferromagnetic first shield layer; and forming the first and second read gap layers between the first shield layer and the first pole piece layer; and a making of the dual spin valve sensor comprising the steps of:
forming first and second pinned layer structures wherein each pinned layer structure has a magnetic moment;
forming antiferromagnetic first and second pinning layers exchange coupled to the first and second pinned layer structures for pinning the magnetic moment of the first and second pinned layers respectively;
forming an antiparallel (AP) coupled free layer structure between the first and second pinned layer structures with a magnetic moment;

forming a nonmagnetic conductive first spacer layer between the first pinned layer structure and the AP coupled free layer structure and a nonmagnetic conductive second spacer layer between the second pinned layer structure and the AP coupled free layer structure;

a making of the AP coupled free layer structure including the steps of:

forming an antiparallel (AP) coupling layer and ferromagnetic first and second antiparallel (AP) coupled free layers with the AP coupling layer between the first and second AP coupled free layers with one of the AP coupled free layers selected to have a thickness greater than the other of the first and second AP coupled free layer to allow file resetting, wherein one of the first and second AP coupled free layers has a higher magnetic moment than the other AP coupled free layer; and setting the magnetic moments of the first and second pinned layers by applying a file reset current pulse with the first and second anti ferromagnetic pinning layers orienting the magnetic moments of the first and second pinned layers, the magnetic moments of the pinned layers being set antiparallel with respect to each other so that a spin valve effect on each side of the antiparallel coupled free layer structure are additive.

54. A method as claimed in claim 53 further comprising the steps of:

forming a ferromagnetic second shield layer between the second read gap layer and the first pole piece layer; and forming a nonmagnetic separation layer between the second shield layer the first pole piece layer.

55. A method as claimed in claim 53 wherein the blocking temperature of each of the materials of the first and second pinning layers is less than 350° C.

56. A method as claimed in claim 55 wherein each of the materials of the first and second pinning layers are the same.

57. A method as claimed in claim 56 wherein each of said materials of the first and second pinning layers is selected from the group comprising FeMn, NiO, IrMn, NiMn, PdMn, PtMn, PdPtMn and $RFe_2O_3$ where R is a rare earth element or Yttrium.

58. A method as claimed in claim 53 wherein the first and second pinning layers are formed of first and second materials with first and second blocking temperatures respectively that are different.

59. A method as claimed in claim 58 wherein said first material is iridium manganese (IrMn) or nickel oxide (NiO) and the second material is iron manganese (FeMn).

60. A method as claimed in claim 53 wherein a making of each of the first and second pinned layer structures includes the steps of forming an antiparallel (AP) coupling layer and first and second antiparallel (AP) pinned layers with the AP coupling layer located between the first and second AP pinned layers.

61. A method as claimed in claim 60 wherein each of the first and second pinning layers is made of a material that has a blocking temperature less than 350° C.

62. A method as claimed in claim 61 wherein the materials of the first and second pinning layers are the same.

63. A method as claimed in claim 62 wherein the materials of the first and second pinning layers are selected from the group comprising FeMn, NiO, IrMn, NiMn, PdMn, PtMn, PdPtMn and $RFe_2O_3$ where R is a rare earth element or Yttrium.

64. A method as claimed in claim 60 wherein the first and second pinning layers are formed of first and second materials with first and second blocking temperatures respectively that are different.

65. A method as claimed in claim 64 wherein said first material is iridium manganese (IrMn) or nickel oxide (NiO) and the second material is iron manganese (FeMn).

* * * * *